US011441669B2

(12) United States Patent
Trutschel et al.

(10) Patent No.: US 11,441,669 B2
(45) Date of Patent: Sep. 13, 2022

(54) HYDRAULIC CONTROL SYSTEM AND VEHICLE

(71) Applicant: GREAT WALL MOTOR COMPANY LIMITED, Hebei (CN)

(72) Inventors: Ralf Trutschel, Hebei (CN); Huaxue Liu, Hebei (CN); Guangqing Tang, Hebei (CN); Wei Zhang, Hebei (CN); Lin Zhou, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 17/272,003

(22) PCT Filed: Aug. 28, 2019

(86) PCT No.: PCT/CN2019/103037
§ 371 (c)(1),
(2) Date: Feb. 26, 2021

(87) PCT Pub. No.: WO2020/043125
PCT Pub. Date: Mar. 5, 2020

(65) Prior Publication Data
US 2021/0190199 A1   Jun. 24, 2021

(30) Foreign Application Priority Data

Aug. 28, 2018 (CN) .......................... 201810987945.5

(51) Int. Cl.
*F16H 61/00* (2006.01)
*F16H 57/04* (2010.01)

(52) U.S. Cl.
CPC ..... *F16H 57/0413* (2013.01); *F16H 57/0435* (2013.01); *F16H 61/0025* (2013.01);
(Continued)

(58) Field of Classification Search
CPC ............. F16H 59/0413; F16H 57/0435; F16H 61/0025; F16H 2061/0034;
(Continued)

(56) References Cited

U.S. PATENT DOCUMENTS

| 8,042,672 B2 | 10/2011 | Grethel et al. |
| 2003/0047410 A1 * | 3/2003 | Busold ..................... F16D 48/02 192/48.91 |

(Continued)

FOREIGN PATENT DOCUMENTS

| CN | 101936387 A | 1/2011 |
| CN | 201992053 U | 9/2011 |

(Continued)

OTHER PUBLICATIONS

ISR for PCT/CN2019/103037 dated Oct. 23, 2019, 4 pages.
(Continued)

*Primary Examiner* — David J Hlavka
(74) *Attorney, Agent, or Firm* — Nixon Peabody LLP; Jeffrey L. Costellia (57) ABSTRACT

A hydraulic controlling system including: a cooling and lubricating oil line and a main controlling oil line; an oil-liquid storage; a first pump, wherein an inlet of the first pump is connected to the oil-liquid storage and an outlet of the first pump is connected to the main controlling oil line; a second pump, wherein an inlet of the second pump is connected to the oil-liquid storage and an outlet of the second pump selectively communicates with the cooling and lubricating oil line or the main controlling oil line; and a gearbox-gear-shifting oil line including a gear-shifting-pressure regulating valve, a plurality of gear-shifting-flow-rate controlling valves and a plurality of gear-shifting selector valves. The gear-shifting-flow-rate controlling valves are connected to the main controlling oil line via the gear-
(Continued)

shifting-pressure regulating valve. At least some of the gear-shifting-flow-rate controlling valves are connected to a gear-shifting executing piston via the gear-shifting selector valves.

20 Claims, 1 Drawing Sheet

(52) U.S. Cl.
CPC .............. *F16H 2061/0034* (2013.01); *F16H 2061/0037* (2013.01)

(58) Field of Classification Search
CPC ......... F16H 2061/0037; F16H 57/0439; F16H 57/0446; F16H 61/0031; F16H 61/0267; F16H 57/0404; F16H 57/0441; F16D 48/0206
See application file for complete search history.

(56) References Cited

U.S. PATENT DOCUMENTS

2010/0081547 A1   4/2010   Kobayashi et al.
2013/0206533 A1*  8/2013   Mepham ............. F16H 61/0021
                                                    192/48.601
2016/0032986 A1   2/2016   Pritchard
2017/0045139 A1   2/2017   Novak et al.

FOREIGN PATENT DOCUMENTS

| CN | 102230533 A | 11/2011 |
| CN | 102483151 A | 5/2012 |
| CN | 103192821 A | 7/2013 |
| CN | 204083196 U | 1/2015 |
| CN | 105465355 A | 4/2016 |
| CN | 207621329   | 7/2018 |
| CN | 207621329 U | 7/2018 |
| JP | 2011089624 A | 5/2011 |
| KR | 20140137580 A | 12/2014 |
| KR | 20150001027 A | 1/2015 |

OTHER PUBLICATIONS

CN Office Action for CN201810987945.5 dated Feb. 3, 2021, 5 pages.
CN Search Report for CN201810987945.5 dated Aug. 28, 2018, 1 page.
Extended European Search Report (Application No. 19856327.2) dated May 2, 2022 (8 pages).

* cited by examiner

HYDRAULIC CONTROL SYSTEM AND VEHICLE

CROSS REFERENCE TO RELATED APPLICATIONS

This application is the National Phase of International Application No. PCT/CN2019/103037, filed Aug. 28, 2019, which designated the United States. This application also includes a claim of priority under 35 U.S.C. § 119(a) and § 365(b) to Chinese Application No. 201810987945.5 filed Aug. 28, 2018, the entirety of which is hereby incorporated by reference.

TECHNICAL FIELD

The present disclosure relates to the technical field of hydraulic controlling of vehicles, and particularly relates to a hydraulic controlling system and a vehicle having the hydraulic controlling system.

BACKGROUND

Currently, automatic gearboxes are being increasingly extensively applied in the automobile industry. Moreover, double-clutch automatic gearboxes, because of the advantages such as the compact structure, the good economic efficiency of the fuel, the large torque transmission capacity, and the good starting performance and gear-shifting quality, have become a current research hotspot in the field of gearboxes globally.

The double clutches in wet double-clutch automatic gearboxes, in the process of engagement, generates a large amount of heat due to the sliding g friction, and if the heat is not dissipated timely, it results in the ablation of the double clutches. Therefore, the quality of the designing of the cooling and lubricating system of double-clutch automatic gearboxes directly decides the operating performance of the double-clutch automatic gearboxes. In the related art, double-clutch automatic gearboxes usually employ a mechanical pump of a large displacement to supply the flow rate. However, mechanical pumps have large volumes and weights, which results in that the entire gearbox has a low efficiency and a poor economic efficiency of the fuel.

Furthermore, the double-clutch automatic gearboxes in the related art merely focus on the matching with traditional internal combustion engines, and do not take into consideration that with hybrid-power vehicles, so the improvement on the economic efficiency of the fuel of the entire vehicle is limited.

SUMMARY

In view of the above, the present disclosure provides a hydraulic controlling system, to reduce the displacement of the pump body.

In order to achieve the above object, the technical solutions of the present disclosure are realized as follows:

A hydraulic controlling system, wherein the hydraulic controlling system comprises: a cooling and lubricating oil line and a main controlling oil line; an oil-liquid storage; a first pump, wherein an inlet of the first pump is connected to the oil-liquid storage, and an outlet of the first pump is connected to the main controlling oil line; a second pump, wherein an inlet of the second pump is connected to the oil-liquid storage, and an outlet of the second pump selectively communicates with the cooling and lubricating oil line or the main controlling oil line; and a gearbox-gear-shifting oil line, wherein the gearbox-gear-shifting oil line comprises a gear-shifting-pressure regulating valve, a plurality of gear-shifting-flow-rate controlling valves and a plurality of gear-shifting selector valves, the gear-shifting-flow-rate controlling valves are connected to the main controlling oil line via the gear-shifting-pressure regulating valve, and at least some of the plurality of gear-shifting-flow-rate controlling valves are connected to a gear-shifting executing piston via the gear-shifting selector valves.

As compared with the prior art, the hydraulic controlling system according to the present disclosure has the following advantages:

(1) The hydraulic controlling system according to the present disclosure, by using the controlling mode that combines the gear-shifting-pressure regulating valve and the gear-shifting-flow-rate controlling valves, can realize quick and steady gear-shifting.

Another object of the present disclosure is to provide a vehicle, to realize the hydraulic controlling of hybrid-power vehicles.

In order to achieve the above object, the technical solutions of the present disclosure are realized as follows:

A vehicle, wherein the vehicle is a hybrid-power vehicle, and comprises the hydraulic controlling system of any one of the above items.

The vehicle has the same advantages as those of the above hydraulic controlling system over the prior art, which is not discussed here further.

BRIEF DESCRIPTION OF THE DRAWINGS

The drawings, which form part of the present disclosure, are intended to provide a further understanding of the present disclosure. The illustrative embodiments of the present disclosure and their explanation are intended to interpret the present disclosure, and do not inappropriately limit the present disclosure. In the drawings.

DESCRIPTION OF THE REFERENCE NUMBERS

Oil-liquid storage 1, suction filter 2, second pump 3, first pump 4, second one-way valve 5, first one-way valve 6, selector valve 7, first main-oil-line energy accumulator 8, second main-oil-line energy accumulator 9, main pressure regulating solenoid valve 10, main pressure regulating energy accumulator 11, main pressure regulating valve 12, safety valve 13, oil-cooler by-pass valve 14, oil cooler 15, press filter 16, press-filter by-pass valve 17, first flow restriction orifice 18, second flow restriction orifice 19, lubrication-flow-rate solenoid valve 20, pressure limiting valve 21, third flow restriction orifice 22, lubrication selector valve 23, fourth flow restriction orifice 24, first clutch-pressure controlling solenoid valve 25, first pressure sensor 26, first clutch energy accumulator 27, electric-motor clutch 28, electric motor 29, parking switching solenoid valve 30, parking piston 31, second clutch-pressure controlling solenoid valve 32, second pressure sensor 33, second clutch energy accumulator 34, first main clutch 35, third clutch-pressure controlling solenoid valve 36, third clutch energy accumulator 37, third pressure sensor 38, second main clutch 39, gear-shifting-pressure regulating valve 40, gear-shifting oil-line energy accumulator 41, switching solenoid valve 42, first gear-shifting-flow-rate controlling valve 43, second gear-shifting-flow-rate controlling valve 44, third gear-shifting-flow-rate controlling valve 45, first gear-shifting selector valve 46, second gear-shifting selector valve 47, gear-shifting oil-line one-way valve 48, first gear-shifting executing piston 50, third gear-shifting executing piston 51, fourth gear-shifting executing piston 52, fifth gear-shifting executing piston 53, lubricating oil line 54 of gearbox, cooling and lubricating oil line 60, central cooling and lubricating line 61, first branch line 62, second branch line 63, third branch line 64, main controlling oil line 70, clutching controlling oil line 71, electrohydraulic parking oil line 72, and gearbox-gear-shifting oil line 73.

DETAILED DESCRIPTION

It should be noted that, subject to the avoiding of any conflict, the embodiments and the features of the embodiments of the present disclosure can be combined.

The present disclosure will be described in detail below with reference to the drawings and the embodiments.

The hydraulic controlling system of the embodiments of the present disclosure may be used in a wet double-clutch hybrid-power gearbox. The hydraulic controlling system can realize the controlling on the cooling and the lubrication, the controlling on the engagement and the disengagement between the clutches, the controlling on the switching between different gears, the controlling on the hybrid power and the controlling on the electrohydraulic parking of the double-clutch hybrid-power gearbox.

Figure 1:
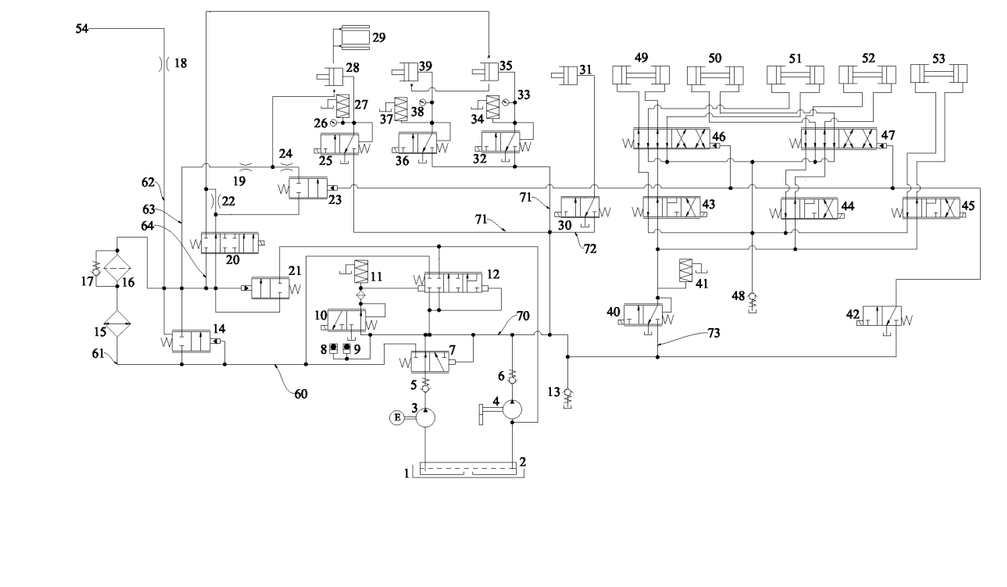
FIG. 1 is a schematic structural diagram of the hydraulic controlling system according to an embodiment of the present disclosure.

As shown in FIG. 1, the hydraulic controlling system according to an embodiment of the present disclosure comprises: an oil-liquid storage 1, a cooling and lubricating oil line 60, a main controlling oil line 70, a first pump 4, a second pump 3, a selector valve 7 and a main pressure regulating valve 12.

The oil-liquid storage 1 is used to store oil liquid. The oil-liquid storage 1 may be the oil pan of the gearbox. The first pump 4 and the second pump 3 are used to provide the circulating power to the oil liquid. The first pump 4 may be a mechanical pump. The second pump 3 may be an electronic pump. The displacement of the electronic pump may be selected according to the model of the loaded car. The electronic pump may also be a double-stage electronic pump. Accordingly, the displacement of the mechanical pump can be designed to be small, thereby reducing the volume and the weight of the mechanical pump, and improving the operating efficiency of the mechanical pump and the economic efficiency of the fuel of the entire vehicle.

The inlet of the first pump 4 is connected to the oil-liquid storage 1. The outlet of the first pump 4 is connected to the main controlling oil line 70. The inlet of the second pump 3 is connected to the oil-liquid storage 1. The outlet of the second pump 3 may selectively communicate with the cooling and lubricating oil line 60 or the main controlling oil line 70. For example, the inlet of the selector valve 7 is connected to the outlet of the second pump 3, a first outlet of the selector valve 7 is connected to the main controlling oil line 70, and a second outlet of the selector valve 7 is connected to the cooling and lubricating oil line 60.

The inlet of the first pump 4 and the inlet of the second pump 3 may be connected to the oil-liquid storage 1 via a suction filter 2. The oil liquid inside the oil-liquid storage 1 may be filtered for the first time by the suction filter 2. A first one-way valve 6 may be provided at the outlet of the first pump 4. The first one-way valve 6 turns on unidirectionally from the outlet of the first pump 4 to the main controlling oil line 70. A second one-way valve 5 may be provided at the outlet of the second pump 3. The second one-way valve 5 turns on unidirectionally from the outlet of the second pump 3 to the inlet of the selector valve 7. The first one-way valve 6 and the second one-way valve 5 are used to prevent oil return of the system. The first pump 4 and the second pump 3 may separately supply oil or simultaneously supply oil.

The selector valve 7 is used to switch the flow rate of the oil liquid outputted by the second pump 3 between a main oil line and a lubricating oil line, which enables the first pump 4 to be a small-displacement pump. In some embodiments, the selector valve 7 may be controlled by using the pressure of the main oil line, and a controlling oil port of the selector valve 7 is connected to the main controlling oil line 70. Accordingly, when the pressure of the main controlling oil line 70 is less than a first preset value, the inlet of the selector valve 7 communicates with a first outlet of the selector valve 7, and both of the first pump 4 and the second pump 3 supply oil to the main controlling oil line 70. When the pressure of the main controlling oil line 70 is greater than a second preset value, the inlet of the selector valve 7 communicates with a second outlet of the selector valve 7, and the second pump 3 is switched to supply oil to the cooling and lubricating oil line 60.

Both of a first inlet and a second inlet of the main pressure regulating valve 12 are connected to the main controlling oil line 70, a first outlet of the main pressure regulating valve 12 is connected to the cooling and lubricating oil line 60, and a second outlet of the main pressure regulating valve 12 is connected to the inlet of the first pump 4. Accordingly, when the inlet of the selector valve 7 communicates with the first outlet of the selector valve 7, part of the oil liquid of the main controlling oil line 70 may be diverted via the main pressure regulating valve 12 to the cooling and lubricating oil line 60, which ensures that the supply of the cooling and lubricating oil line 60 is not interrupted. In other words, the hydraulic controlling system can ensure that the oil pressure of the main controlling oil line 70 is maintained at a high level, while not affecting the cooling and the lubrication of the cooling and lubricating oil line 60.

When the main oil pressure is less than the first preset value, the oil liquid outputted by the second pump 3 passes through the second one-way valve 5 and the selector valve 7 and reaches the main pressure regulating valve 12, and the oil liquid outputted by the first pump 4 passes through the first one-way valve 6 and reaches the main pressure regulating valve 12. The pressure of the main pressure regulating valve 12 may be regulated by a main pressure regulating solenoid valve 10. A main pressure regulating energy accumulator 11 may be provided between the main pressure regulating valve 12 and the main pressure regulating solenoid valve 10.

When the pressure of the main pressure regulating valve 12 is greater than the second preset value, the selector valve 7 acts, the oil liquid outputted by the second pump 3 is switched from leading to the main controlling oil line 70 to leading to the cooling and lubricating oil line 60. A safety valve 13 is used to restrict the maximum pressure of the main controlling oil line 70. A first main-oil-line energy accumulator 8 and a second main-oil-line energy accumulator 9 are used to improve the stability of the pressure of the main controlling oil line 70.

It can be understood that the process of opening the main pressure regulating valve 12 has three stages: a first stage, in which the main pressure regulating valve 12 is shut, and the oil liquid does not lead to the cooling and lubricating oil line 60; a second stage, in which the oil liquid passes through the main pressure regulating valve 12 and enters the cooling and lubricating oil line 60, to provide cooling and lubricating flow rates to an electric-motor clutch 28, an electric motor 29 and a main clutch; and a third stage, in which, after the oil liquid has passed through the main pressure regulating valve 12, part of the oil liquid enters the cooling and lubricating oil line 60 and moves to the electric-motor clutch 28, the electric motor 29, the main clutch and the bearings and the gears of the gearbox, and the remaining oil liquid passes through the main pressure regulating valve 12 and directly returns to the inlet of the first pump 4. The main clutch comprises a first main clutch 35 and a second main clutch 39.

The hydraulic controlling system according to the embodiment of the present disclosure, by using the first pump 4, the second pump 3, the selector valve 7 and the main pressure regulating valve 12, can effectively reduce the displacement and the volume of the pump body, while not affecting the oil pressure of the main controlling oil line 70, can ensure that the supply of the cooling and lubricating oil line 60 is not interrupted, and has a high efficiency of the pump body and little risk of failure of the clutches.

In some embodiments, as shown in FIG. 1, the cooling and lubricating oil line 60 comprises: a central cooling and lubricating line 61, a first branch line 62, a second branch line 63 and a third branch line 64.

The inlet end of the central cooling and lubricating line 61 is connected to the second outlet of the selector valve 7, and the inlet end of the central cooling and lubricating line 61 is connected to the first outlet of the main pressure regulating valve 12. The inlet end of the first branch line 62 is connected to the outlet end of the central cooling and lubricating line 61. The inlet end of the second branch line 63 is connected to the outlet end of the central cooling and lubricating line 61. The inlet end of the third branch line 64 is connected to the outlet end of the central cooling and lubricating line 61.

The central cooling and lubricating line 61 may comprise: an oil-cooler by-pass valve 14, an oil cooler 15, a press filter 16 and a press-filter by-pass valve 17.

The inlet of the oil cooler 15 is connected to the inlet end of the central cooling and lubricating line 61. The outlet of the oil cooler 15 is connected to the outlet of the press filter 16. The outlet of the press filter 16 is connected to the outlet end of the central cooling and lubricating line 61. The inlet of the press-filter by-pass valve 17 is connected to the outlet of the press filter 16. The outlet of the press-filter by-pass valve 17 is connected to the inlet of the press filter 16. The inlet of the oil-cooler by-pass valve 14 is connected to the inlet end of the central cooling and lubricating line 61. The outlet of the oil-cooler by-pass valve 14 is connected to the outlet end of the central cooling and lubricating line 61. A controlling oil port of the oil-cooler by-pass valve 14 is connected to the inlet end of the central cooling and lubricating line 61.

The inlet end of the first branch line 62 is connected to the outlet end of the central cooling and lubricating line 61. The first branch line 62 is provided with a first flow restriction orifice 18. The outlet end of the first branch line 62 is adapted for being connected to a lubricating oil line 54 of the gearbox, to in turn lubricate the bearings and the gears of the gearbox.

The inlet end of the second branch line 63 is connected to the outlet end of the central cooling and lubricating line 61. The second branch line 63 is provided with a second flow restriction orifice 19. The outlet end of the second branch line 63 is adapted for being connected to a lubricating oil line for the electric motor 29 and the electric-motor clutch 28.

The third branch line 64 is provided with a lubrication-flow-rate solenoid valve 20, a third flow restriction orifice 22, a lubrication selector valve 23 and a fourth flow restriction orifice 24. Both of a first inlet and a second inlet of the lubrication-flow-rate solenoid valve 20 are connected to the outlet end of the central cooling and lubricating line 61. A first outlet of the lubrication-flow-rate solenoid valve 20 is adapted for being connected to a lubricating oil line of the main clutch. A second outlet of the lubrication-flow-rate solenoid valve 20 is connected to the inlet of the lubrication selector valve 23. The inlet of the third flow restriction orifice 22 is connected to a first outlet of the lubrication-flow-rate solenoid valve 20. The outlet of the third flow restriction orifice 22 is connected between a second outlet of the lubrication-flow-rate solenoid valve 20 and the inlet of the lubrication selector valve 23. The outlet of the lubrication selector valve 23 is connected to the inlet of the fourth flow restriction orifice 24. The outlet of the fourth flow restriction orifice 24 is connected between the outlet of the second flow restriction orifice 19 and the lubricating oil line for the electric motor 29 and the electric-motor clutch 28. Part of the oil liquid flowing out of the first outlet of the lubrication-flow-rate solenoid valve 20 can lubricate the first main clutch 35 and the second main clutch 39, and the other part of the oil liquid flowing out of the first outlet of the lubrication-flow-rate solenoid valve 20 increases the lubricating flow rates of the electric-motor clutch 28 and the electric motor 29 via the lubrication selector valve 23. The lubrication selector valve 23 is controlled by a switching solenoid valve 42.

A first port of the switching solenoid valve 42 is connected to the oil-liquid storage 1. A second port of the switching solenoid valve 42 is connected to the main controlling oil line 70. A third port of the switching solenoid valve 42 is connected to a controlling oil port of the lubrication selector valve 23.

As shown in FIG. 1, the cooling and lubricating oil line 60 further comprises a pressure limiting valve 21. The inlet of the pressure limiting valve 21 and a controlling oil port of the pressure limiting valve 21 are connected to the outlet end of the central cooling and lubricating line 61. The outlet of the pressure limiting valve 21 is connected to the inlet of the first pump 4. The pressure limiting valve 21 is used to restrict the maximum pressure of the cooling and lubricating oil line 60, and the excessive oil liquid is returned to the inlet of the first pump 4.

In the hydraulic controlling system having the cooling and lubricating oil line 60 of the above structure, the process of opening the main pressure regulating valve 12 has three stages:

In a first stage, the main pressure regulating valve 12 is shut, and the oil liquid does not lead to the cooling and lubricating system.

In a second stage, the main pressure regulating valve 12 provides cooling and lubricating flow rates to the electric-motor clutch 28, the electric motor 29, the first main clutch 35 and the second main clutch 39. The oil liquid that has passed through the main pressure regulating valve 12 firstly reaches the oil cooler and the oil-cooler by-pass valve, and then flows through the press filter 16 and the press-filter by-pass valve 17, to diverge into the three branch lines. The first branch line 62 passes through the flow restriction orifice and lubricates the bearings and the gears of the gearbox. The second branch line 63 passes through the flow restriction orifice and performs basic lubrication to the electric-motor clutch 28 and the electric motor 29. The third branch line 64 passes through the lubrication-flow-rate solenoid valve and further diverges into two oil lines, wherein one of the oil lines passes through the first main clutch 35 and reaches the second main clutch 39, to complete the cooling and the lubrication to the main clutch, and the other one of the oil lines passes through the lubrication selector valve 23 to increase the lubricating flow rates of the electric-motor clutch 28 and the electric motor 29, wherein the lubrication selector valve 23 is controlled by the switching solenoid valve 42.

The oil cooler is used to cool the oil liquid of the gearbox. The oil-cooler by-pass valve is used to protect the oil cooler and the press filter 16. When the flow rates that reach the oil cooler and the press filter 16 from the main pressure regulating valve 12 are large, the oil-cooler by-pass valve will be opened, to protect the oil cooler and the press filter 16.

In a third stage, after the oil liquid has passed through the main pressure regulating valve 12, part of the oil liquid passes through the oil cooler and the press filter 16 and moves to the electric-motor clutch 28, the electric motor 29, the first main clutch 35, the second main clutch 39, the bearings and the gears, and the remaining oil liquid passes through the main pressure regulating valve 12 and directly returns to the oil suction of the first pump 4.

In some embodiments, as shown in FIG. 1, the main controlling oil line 70 comprises a clutching controlling oil line 71. The clutching controlling oil line 71 comprises a plurality of clutch-pressure controlling solenoid valves. First ports of the clutch-pressure controlling solenoid valves are connected to the oil-liquid storage 1. Second ports of the clutch-pressure controlling solenoid valves are connected to the main controlling oil line 70. Third ports of the clutch-pressure controlling solenoid valves are individually connected to the corresponding clutches. The clutch-pressure controlling solenoid valves may be pressure-ratio solenoid valves. The clutch-pressure controlling solenoid valves may include a first clutch-pressure controlling solenoid valve 25, a second clutch-pressure controlling solenoid valve 32 and a third clutch-pressure controlling solenoid valve 36.

When the system is required to control the different clutches to engage and disengage, the oil liquid outputted by the second pump 3 and the first pump 4 is diverged into three lines, wherein one of the lines passes through the first clutch-pressure controlling solenoid valve 25 and reaches the electric-motor clutch 28; another line passes through the second clutch-pressure controlling solenoid valve 32 and reaches the first main clutch 35; and the other line passes through the third clutch-pressure controlling solenoid valve 36 and reaches the second main clutch 39, to finally realize the controlling on the engagement and the disengagement of the three clutches.

A first clutch energy accumulator 27 is used to maintain the pressure of the electric-motor clutch 28 stable, to prevent pressure surge. A second clutch energy accumulator 34 is used to maintain the pressure of the first main clutch 35 stable, to prevent pressure surge. A third clutch energy accumulator 37 is used to maintain the pressure of the second main clutch 39 stable, to prevent pressure surge.

A first pressure sensor 26 monitors in real time the pressure of the electric-motor clutch 28, so as to regulate the pressure timely. A second pressure sensor 33 monitors in real time the pressure of the first main clutch 35, so as to regulate the pressure timely. A third pressure sensor 38 monitors in real time the pressure of the second main clutch 39, so as to regulate the pressure timely.

In some embodiments, as shown in FIG. 1, the main controlling oil line 70 comprises an electrohydraulic parking oil line 72. The electrohydraulic parking oil line 72 is provided with a parking switching solenoid valve 30. A first port of the parking switching solenoid valve 30 is connected to the oil-liquid storage 1. A second port of the parking switching solenoid valve 30 is connected to the main controlling oil line 70. A third port of the parking switching solenoid valve 30 is connected to a parking piston 31.

When it is required to control the electrohydraulic parking, the oil liquid outputted by the second pump 3 and the first pump 4 passes through the parking switching solenoid valve 30 and directly reaches the parking piston 31, to realize the unlocking of the parking mechanism.

In some embodiments, as shown in FIG. 1, the hydraulic controlling system comprises a gearbox-gear-shifting oil line 73. The gearbox-gear-shifting oil line 73 comprises a gear-shifting-pressure regulating valve 40, a plurality of gear-shifting-flow-rate controlling valves and a plurality of gear-shifting selector valves. The gear-shifting-pressure regulating valve 40 and the gear-shifting-flow-rate controlling valves may be solenoid valves. The gear-shifting selector valves may be mechanical valves. Accordingly, the controlling on the gear-shifting pressure and flow rate is convenient, and the gear-shifting selector valves perform the gear shifting stably.

The gear-shifting-flow-rate controlling valves are connected to the main controlling oil line 70 via the gear-shifting-pressure regulating valve 40. A first port of the gear-shifting-pressure regulating valve 40 is connected to the oil-liquid storage 1. A second port of the gear-shifting-pressure regulating valve 40 is connected to the main controlling oil line 70. A third port of the gear-shifting-pressure regulating valve 40 is connected to the gear-shifting-flow-rate controlling valves. At least some of the plurality of gear-shifting-flow-rate controlling valves are connected to a gear-shifting executing piston via the gear-shifting selector valves.

As shown in FIG. 1, the gear-shifting-flow-rate controlling valves include a first gear-shifting-flow-rate controlling valve 43, a second gear-shifting-flow-rate controlling valve 44 and a third gear-shifting-flow-rate controlling valve 45. The gear-shifting-flow-rate controlling valves may be proportional-flow solenoid valves. The gear-shifting selector valves include a first gear-shifting selector valve 46 and a second gear-shifting selector valve 47. The first gear-shifting-flow-rate controlling valve 43 is connected to a gear-shifting executing piston via the first gear-shifting selector valve 46. The second gear-shifting-flow-rate controlling valve 44 is connected to the gear-shifting executing piston via the second gear-shifting selector valve 47. The third gear-shifting-flow-rate controlling valve 45 is connected to a fifth gear-shifting executing piston 53.

When the gearbox is required to switch between different gears, the oil liquid outputted by the second pump 3 and the first pump 4 passes through the gear-shifting-pressure regulating valve 40, then passes through the first gear-shifting-flow-rate controlling valve 43, the second gear-shifting-flow-rate controlling valve 44 and the third gear-shifting-flow-rate controlling valve 45, then passes through the first gear-shifting selector valve 46 and the second gear-shifting selector valve 47, and reaches a first gear-shifting executing piston 49, a second gear-shifting executing piston 50, a third gear-shifting executing piston 51, a fourth gear-shifting executing piston 52 and the fifth gear-shifting executing piston 53, thereby realizing the switching between 1 reverse gear and 8 forward gears. Furthermore, by various combinations, that can be expanded to 1 reverse gear and 9 forward gears.

The switching between the positions of the first gear-shifting selector valve 46 and the second gear-shifting selector valve 47 is controlled by the switching solenoid valve 42. The third port of the switching solenoid valve 42 is connected to a controlling oil port of the first gear-shifting selector valve 46, and a third port of the switching solenoid valve 42 is connected to a controlling oil port of the second gear-shifting selector valve 47. A gear-shifting oil-line energy accumulator 41 is used to improve the stability of the pressure of the gear-shifting oil line, to prevent pressure surge. A gear-shifting oil-line one-way valve 48 is used to maintain the back pressure of the gearbox-gear-shifting oil line 73, to prevent the oil liquid from flowing out of the gearbox-gear-shifting oil line 73, thereby preventing the delay in the gear shifting caused by oil filling of the gearbox-gear-shifting oil line 73, to shorten the gear-shifting response time.

The hydraulic controlling system is configured to, in the gear-shifting starting stage, maintain the outputted pressure of the gear-shifting-pressure regulating valve 40 at a first preset pressure, and regulate the gear-shifting flow rates by using the gear-shifting-flow-rate controlling valves. The hydraulic controlling system is configured to, in the gear-shifting synchronizing stage, maintain the controlling source of the gear-shifting-flow-rate controlling valves unchanged, and increase the outputted pressure of the gear-shifting-pressure regulating valve 40.

When the gearbox is required to switch between different gears, the oil liquid outputted by the second pump 3 and the first pump 4 passes through the gear-shifting-pressure regulating valve 40, then passes through the first gear-shifting-flow-rate controlling valve 43, the second gear-shifting-flow-rate controlling valve 44 and the third gear-shifting-flow-rate controlling valve 45, then passes through the first gear-shifting selector valve 46 and the second gear-shifting selector valve 47, and reaches the first gear-shifting executing piston 49, the second gear-shifting executing piston 50, the third gear-shifting executing piston 51, the fourth gear-shifting executing piston 52 and the fifth gear-shifting executing piston 53, thereby realizing the switching between 1 reverse gear and 8 forward gears. Furthermore, by various combinations and changing the software control strategy, that can be expanded to 1 reverse gear and 9 forward gears.

In the gear-shifting starting stage, the gear-shifting-pressure regulating valve 40 maintains a small pressure, the gear-shifting flow rates are regulated by the first gear-shifting-flow-rate controlling valve 43, the second gear-shifting-flow-rate controlling valve 44 and the third gear-shifting-flow-rate controlling valve 45, and in turn the movement speeds of the first gear-shifting executing piston 49, the second gear-shifting executing piston 50, the third gear-shifting executing piston 51, the fourth gear-shifting executing piston 52 and the fifth gear-shifting executing piston 53 are controlled, to enable the movements of the gear-shifting executing pistons to be steady and impact free.

In the gear-shifting synchronizing stage, the gear-shifting flow rates are maintained, the controlling currents of the first gear-shifting-flow-rate controlling valve 43, the second gear-shifting-flow-rate controlling valve 44 and the third gear-shifting-flow-rate controlling valve 45 are controlled to be unchanged, and the pressure of the gear-shifting-pressure regulating valve 40 is increased, thereby realizing quick synchronization and shortening the gear-shifting synchronizing time.

The controlling mode that combines the gear-shifting-pressure regulating valve 40, the first gear-shifting-flow-rate controlling valve 43, the second gear-shifting-flow-rate controlling valve 44 and the third gear-shifting-flow-rate controlling valve 45 realizes quick and steady gear shifting. The switching between the positions of the first gear-shifting selector valve 46 and the second gear-shifting selector valve 47 is controlled by the switching solenoid valve 42. The energy accumulator 41 is used to improve the stability of the pressure of the gear-shifting oil line, to prevent pressure surge. The one-way valve 48 is used to maintain the back pressure of the gear-shifting oil line, to prevent the oil liquid from flowing out of the gear-shifting oil line, thereby preventing the delay in the gear shifting caused by oil filling of the gear-shifting oil line, to shorten the gear-shifting response time.

It can be known from the above description that the hydraulic controlling system according to the embodiments of the present disclosure supplies oil by using double pumps, the first pump 4 and the second pump 3. The first pump 4 may be a mechanical pump. The second pump 3 may be an electronic pump. The displacement of the second pump 3 may be selected according to demands of different models of the car, and may also be a double-stage electronic pump. When the first pump 4 is not working, the second pump 3 may be used for intelligent start-stop and gear shifting of the hybrid-power system.

The selector valve 7 is controlled by the pressure of the main controlling oil line 70, and is used to switch the flow rate of the oil liquid outputted by the second pump 3 between the main controlling oil line 70 and the cooling and lubricating oil line 60.

The lubrication of the electric-motor clutch 28, the first main clutch 35, the second main clutch 39 and the electric motor 29 is controlled by one lubrication-flow-rate solenoid valve 20, the switching solenoid valve 42 controlled by the switching solenoid valve 42, the second flow restriction orifice 19, the third flow restriction orifice 22 and the fourth flow restriction orifice 24.

The first pressure-ratio solenoid valve 25, the second pressure-ratio solenoid valve 32 and the third pressure-ratio solenoid valve 36 realize the controlling on the electric-motor clutch 28, the first main clutch 35 and the second main clutch 39.

One parking switching solenoid valve 30 controls the parking piston 31, to realize the unlocking of the parking mechanism.

The gear-shifting controlling unit employs one pressure-ratio solenoid valve to regulate the pressure. The first gear-shifting-flow-rate controlling valve 43, the second gear-shifting-flow-rate controlling valve 44 and the third gear-shifting-flow-rate controlling valve 45 regulate the flow rates, which, in cooperation with the first gear-shifting selector valve 46 and the second gear-shifting selector valve 47 controlled by one switching solenoid valve 42, realizes the switching between 1 reverse gear and 8 forward gears. Furthermore, that can be expanded to 1 reverse gear and 9 forward gears.

In conclusion, the hydraulic controlling system according to the embodiments of the present disclosure can reduce the displacement of the mechanical pump, thereby reducing the volume and the weight of the mechanical pump, and improving the operating efficiency of the mechanical pump and the economic efficiency of the fuel of the entire vehicle. The hydraulic controlling system can be directly used for double-clutch automatic-gearbox hybrid-power systems and electrohydraulic parking. The hydraulic controlling system, while reducing the displacement of the mechanical pump, increases the displacement of the electronic pump, so as to provide sufficient lubricating flow rates to the clutches, and reduce the risk of failure of the clutches. The hydraulic controlling system can increase the quantity of the gears of the gearbox, to improve the economic efficiency of the fuel. The hydraulic controlling system can reduce the quantity of the solenoid valves, to reduce the cost of the gearbox.

A hydraulic controlling system, wherein the hydraulic controlling system comprises: a cooling and lubricating oil line and a main controlling oil line; an oil-liquid storage; a first pump, wherein an inlet of the first pump is connected to the oil-liquid storage, and an outlet of the first pump is connected to the main controlling oil line; a second pump, wherein an inlet of the second pump is connected to the oil-liquid storage, and an outlet of the second pump selectively communicates with the cooling and lubricating oil line or the main controlling oil line; and a gearbox-gear-shifting oil line, wherein the gearbox-gear-shifting oil line comprises a gear-shifting-pressure regulating valve, a plurality of gear-shifting-flow-rate controlling valves and a plurality of gear-shifting selector valves, the gear-shifting-flow-rate controlling valves are connected to the main controlling oil line via the gear-shifting-pressure regulating valve, and at least some of the plurality of gear-shifting-flow-rate controlling valves are connected to a gear-shifting executing piston via the gear-shifting selector valves.

In some embodiments, the hydraulic controlling system is configured to, in a gear-shifting starting stage, maintain an outputted pressure of the gear-shifting-pressure regulating valve at a first preset pressure, and regulate gear-shifting flow rates by using the gear-shifting-flow-rate controlling valves, and the hydraulic controlling system is configured to, in a gear-shifting synchronizing stage, maintain a controlling source of the gear-shifting-flow-rate controlling valves unchanged, and increase the outputted pressure of the gear-shifting-pressure regulating valve.

In some embodiments, a first port of the gear-shifting-pressure regulating valve is connected to the oil-liquid storage, a second port of the gear-shifting-pressure regulating valve is connected to the main controlling oil line, and a third port of the gear-shifting-pressure regulating valve is connected to the gear-shifting-flow-rate controlling valves.

In some embodiments, the gear-shifting-flow-rate controlling valves are solenoid valves, and the gear-shifting selector valves are mechanical valves.

In some embodiments, the hydraulic controlling system further comprises: a switching solenoid valve, wherein a first port of the switching solenoid valve is connected to the oil-liquid storage, a second port of the switching solenoid valve is connected to the main controlling oil line, and a third port of the switching solenoid valve is connected to controlling oil ports of the gear-shifting selector valves.

In some embodiments, the hydraulic controlling system further comprises: a selector valve, wherein an inlet of the selector valve is connected to the outlet of the second pump, a first outlet of the selector valve is connected to the main controlling oil line, a second outlet of the selector valve is connected to the cooling and lubricating oil line, and a controlling oil port of the selector valve is connected to the main controlling oil line; and a main pressure regulating valve, wherein a first inlet of the main pressure regulating valve is connected to the main controlling oil line, and a first outlet of the main pressure regulating valve is connected to the cooling and lubricating oil line.

In some embodiments, the cooling and lubricating oil line comprises: a central cooling and lubricating line, wherein an inlet end of the central cooling and lubricating line is connected to the second outlet of the selector valve, and is connected to the first outlet of the main pressure regulating valve; a first branch line, an inlet end of the first branch line is connected to an outlet end of the central cooling and lubricating line, the first branch line is provided with a first flow restriction orifice, and an outlet end of the first branch line is adapted for being connected to a lubricating oil line of a gearbox; a second branch line, wherein an inlet end of the second branch line is connected to the outlet end of the central cooling and lubricating line, the second branch line is provided with a second flow restriction orifice, and an outlet end of the second branch line is adapted for being connected to a lubricating oil line for an electric motor and an electric-motor clutch; and a third branch line, wherein the third branch line is provided with a lubrication-flow-rate solenoid valve, a third flow restriction orifice, a lubrication selector valve and a fourth flow restriction orifice, both of a first inlet and a second inlet of the lubrication-flow-rate solenoid valve are connected to the outlet end of the central cooling and lubricating line, a first outlet of the lubrication-flow-rate solenoid valve is adapted for being connected to a lubricating oil line of a main clutch, a second outlet of the lubrication-flow-rate solenoid valve is connected to an inlet of the lubrication selector valve, an inlet of the third flow restriction orifice is connected to the first outlet of the lubrication-flow-rate solenoid valve, an outlet of the third flow restriction orifice is connected between the second outlet of the lubrication-flow-rate solenoid valve and the inlet of the lubrication selector valve, an outlet of the lubrication selector valve is connected to an inlet of the fourth flow restriction orifice, and an outlet of the fourth flow restriction orifice is connected between the outlet of the second flow restriction orifice and the lubricating oil line for the electric motor and the electric-motor clutch.

In some embodiments, the central cooling and lubricating line comprises: an oil cooler and a press filter, wherein an inlet of the oil cooler is connected to the inlet end of the central cooling and lubricating line, an outlet of the oil cooler is connected to an outlet of the press filter, and an outlet of the press filter is connected to the outlet end of the central cooling and lubricating line; an oil-cooler by-pass valve, wherein an inlet of the oil-cooler by-pass valve is connected to the inlet end of the central cooling and lubricating line, an outlet of the oil-cooler by-pass valve is connected to the outlet end of the central cooling and lubricating line, and a controlling oil port of the oil-cooler by-pass valve is connected to the inlet end of the central cooling and lubricating line; and a pressure limiting valve, wherein an inlet of the pressure limiting valve and a controlling oil port of the pressure limiting valve are connected to the outlet end of the central cooling and lubricating line, and an outlet of the pressure limiting valve is connected to the inlet of the first pump.

In some embodiments, the hydraulic controlling system further comprises: a clutching controlling oil line, wherein the clutching controlling oil line comprises a plurality of clutch-pressure controlling solenoid valves, first ports of the clutch-pressure controlling solenoid valves are connected to the oil-liquid storage, second ports of the clutch-pressure controlling solenoid valves are connected to the main controlling oil line, and third ports of the clutch-pressure controlling solenoid valves are individually connected to corresponding clutches; and an electrohydraulic parking oil line, wherein the electrohydraulic parking oil line is provided with a parking switching solenoid valve, a first port of the parking switching solenoid valve is connected to the oil-liquid storage, a second port of the parking switching solenoid valve is connected to the main controlling oil line, and a third port of the parking switching solenoid valve is connected to a parking piston.

The present disclosure further discloses a vehicle.

The vehicle according to the embodiment of the present disclosure is a hybrid-power vehicle, and comprises the hydraulic controlling system of any one of the above embodiments.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The invention claimed is:

1. A hydraulic controlling system, wherein the hydraulic controlling system comprises:
   a cooling and lubricating oil line (60) and a main controlling oil line (70);
   an oil-liquid storage (1);
   a first pump (4), wherein an inlet of the first pump (4) is connected to the oil-liquid storage (1), and an outlet of the first pump (4) is connected to the main controlling oil line (70);
   a second pump (3), wherein an inlet of the second pump (3) is connected to the oil-liquid storage (1), and an outlet of the second pump (3) selectively communicates with the cooling and lubricating oil line (60) or the main controlling oil line (70); and
   a gearbox-gear-shifting oil line (73), wherein the gearbox-gear-shifting oil line (73) comprises a gear-shifting-pressure regulating valve (40), a plurality of gear-shifting-flow-rate controlling valves and a plurality of gear-shifting selector valves, the gear-shifting-flow-rate controlling valves are connected to the main controlling oil line (70) via the gear-shifting-pressure regulating valve (40), and at least some of the plurality of gear-shifting-flow-rate controlling valves are connected to a gear-shifting executing piston via the gear-shifting selector valves.

2. The hydraulic controlling system according to claim 1, wherein the hydraulic controlling system is configured to, in a gear-shifting starting stage, maintain an outputted pressure of the gear-shifting-pressure regulating valve (40) at a first preset pressure, and regulate gear-shifting flow rates by using the gear-shifting-flow-rate controlling valves, and the hydraulic controlling system is configured to, in a gear-shifting synchronizing stage, maintain a controlling source of the gear-shifting-flow-rate controlling valves unchanged, and increase the outputted pressure of the gear-shifting-pressure regulating valve (40).

3. The hydraulic controlling system according to claim 1, wherein a first port of the gear-shifting-pressure regulating valve (40) is connected to the oil-liquid storage (1), a second port of the gear-shifting-pressure regulating valve (40) is connected to the main controlling oil line (70), and a third port of the gear-shifting-pressure regulating valve (40) is connected to the gear-shifting-flow-rate controlling valves.

4. The hydraulic controlling system according to claim 1, wherein the gear-shifting-flow-rate controlling valves are solenoid valves, and the gear-shifting selector valves are mechanical valves.

5. The hydraulic controlling system according to claim 1, wherein the hydraulic controlling system further comprises:
   a switching solenoid valve (42), wherein a first port of the switching solenoid valve (42) is connected to the oil-liquid storage (1), a second port of the switching solenoid valve (42) is connected to the main controlling oil line (70), and a third port of the switching solenoid valve (42) is connected to controlling oil ports of the gear-shifting selector valves.

6. The hydraulic controlling system according to claim 1, wherein the hydraulic controlling system further comprises:
   a selector valve (7), wherein an inlet of the selector valve (7) is connected to the outlet of the second pump (3), a first outlet of the selector valve (7) is connected to the main controlling oil line (70), a second outlet of the selector valve (7) is connected to the cooling and lubricating oil line (60), and a controlling oil port of the selector valve (7) is connected to the main controlling oil line (70); and
   a main pressure regulating valve (12), wherein a first inlet of the main pressure regulating valve (12) is connected to the main controlling oil line (70), and a first outlet of the main pressure regulating valve (12) is connected to the cooling and lubricating oil line (60).

7. The hydraulic controlling system according to claim 6, wherein the cooling and lubricating oil line (60) comprises:
   a central cooling and lubricating line (61), wherein an inlet end of the central cooling and lubricating line (61) is connected to the second outlet of the selector valve (7), and is connected to the first outlet of the main pressure regulating valve (12);
   a first branch line (62), an inlet end of the first branch line (62) is connected to an outlet end of the central cooling and lubricating line (61), the first branch line (62) is provided with a first flow restriction orifice (18), and an outlet end of the first branch line (62) is adapted for being connected to a lubricating oil line (54) of a gearbox;
   a second branch line (63), wherein an inlet end of the second branch line (63) is connected to the outlet end of the central cooling and lubricating line (61), the second branch line (63) is provided with a second flow restriction orifice (19), and an outlet end of the second branch line (63) is adapted for being connected to a lubricating oil line for an electric motor (29) and an electric-motor clutch (28); and
   a third branch line (64), wherein the third branch line (64) is provided with a lubrication-flow-rate solenoid valve (20), a third flow restriction orifice (22), a lubrication selector valve (23) and a fourth flow restriction orifice (24), both of a first inlet and a second inlet of the lubrication-flow-rate solenoid valve (20) are connected to the outlet end of the central cooling and lubricating line (61), a first outlet of the lubrication-flow-rate solenoid valve (20) is adapted for being connected to a lubricating oil line of a main clutch, a second outlet of the lubrication-flow-rate solenoid valve (20) is connected to an inlet of the lubrication selector valve (23), an inlet of the third flow restriction orifice (22) is connected to the first outlet of the lubrication-flow-rate solenoid valve (20), an outlet of the third flow restriction orifice (22) is connected between the second outlet of the lubrication-flow-rate solenoid valve (20) and the inlet of the lubrication selector valve (23), an outlet of the lubrication selector valve (23) is connected to an inlet of the fourth flow restriction orifice (24), and an outlet of the fourth flow restriction orifice (24) is connected between the outlet of the second flow restriction orifice (19) and the lubricating oil line for the electric motor (29) and the electric-motor clutch (28).

8. The hydraulic controlling system according to claim 7, wherein the central cooling and lubricating line (61) comprises:
- an oil cooler (15) and a press filter (16), wherein an inlet of the oil cooler (15) is connected to the inlet end of the central cooling and lubricating line (61), an outlet of the oil cooler (15) is connected to an outlet of the press filter (16), and an outlet of the press filter (16) is connected to the outlet end of the central cooling and lubricating line (61);
- an oil-cooler by-pass valve (14), wherein an inlet of the oil-cooler by-pass valve (14) is connected to the inlet end of the central cooling and lubricating line (61), an outlet of the oil-cooler by-pass valve (14) is connected to the outlet end of the central cooling and lubricating line (61), and a controlling oil port of the oil-cooler by-pass valve (14) is connected to the inlet end of the central cooling and lubricating line (61); and
- a pressure limiting valve (21), wherein an inlet of the pressure limiting valve (21) and a controlling oil port of the pressure limiting valve (21) are connected to the outlet end of the central cooling and lubricating line (61), and an outlet of the pressure limiting valve (21) is connected to the inlet of the first pump (4).

9. The hydraulic controlling system according to claim 1, wherein the hydraulic controlling system further comprises:
- a clutching controlling oil line (71), wherein the clutching controlling oil line (71) comprises a plurality of clutch-pressure controlling solenoid valves, first ports of the clutch-pressure controlling solenoid valves are connected to the oil-liquid storage (1), second ports of the clutch-pressure controlling solenoid valves are connected to the main controlling oil line (70), and third ports of the clutch-pressure controlling solenoid valves are individually connected to corresponding clutches; and
- an electrohydraulic parking oil line (72), wherein the electrohydraulic parking oil line (72) is provided with a parking switching solenoid valve (30), a first port of the parking switching solenoid valve (30) is connected to the oil-liquid storage (1), a second port of the parking switching solenoid valve (30) is connected to the main controlling oil line (70), and a third port of the parking switching solenoid valve (30) is connected to a parking piston (31).

10. A vehicle, wherein the vehicle is a hybrid-power vehicle, and comprises the hydraulic controlling system according to claim 1.

11. The hydraulic controlling system according to claim 2, wherein a first port of the gear-shifting-pressure regulating valve (40) is connected to the oil-liquid storage (1), a second port of the gear-shifting-pressure regulating valve (40) is connected to the main controlling oil line (70), and a third port of the gear-shifting-pressure regulating valve (40) is connected to the gear-shifting-flow-rate controlling valves.

12. The hydraulic controlling system according to claim 2, wherein the gear-shifting-flow-rate controlling valves are solenoid valves, and the gear-shifting selector valves are mechanical valves.

13. The hydraulic controlling system according to claim 3, wherein the gear-shifting-flow-rate controlling valves are solenoid valves, and the gear-shifting selector valves are mechanical valves.

14. The hydraulic controlling system according to claim 2, wherein the hydraulic controlling system further comprises:
- a switching solenoid valve (42), wherein a first port of the switching solenoid valve (42) is connected to the oil-liquid storage (1), a second port of the switching solenoid valve (42) is connected to the main controlling oil line (70), and a third port of the switching solenoid valve (42) is connected to controlling oil ports of the gear-shifting selector valves.

15. The hydraulic controlling system according to claim 3, wherein the hydraulic controlling system further comprises:
- a switching solenoid valve (42), wherein a first port of the switching solenoid valve (42) is connected to the oil-liquid storage (1), a second port of the switching solenoid valve (42) is connected to the main controlling oil line (70), and a third port of the switching solenoid valve (42) is connected to controlling oil ports of the gear-shifting selector valves.

16. The hydraulic controlling system according to claim 4, wherein the hydraulic controlling system further comprises:
- a switching solenoid valve (42), wherein a first port of the switching solenoid valve (42) is connected to the oil-liquid storage (1), a second port of the switching solenoid valve (42) is connected to the main controlling oil line (70), and a third port of the switching solenoid valve (42) is connected to controlling oil ports of the gear-shifting selector valves.

17. The hydraulic controlling system according to claim 2, wherein the hydraulic controlling system further comprises:
- a selector valve (7), wherein an inlet of the selector valve (7) is connected to the outlet of the second pump (3), a first outlet of the selector valve (7) is connected to the main controlling oil line (70), a second outlet of the selector valve (7) is connected to the cooling and lubricating oil line (60), and a controlling oil port of the selector valve (7) is connected to the main controlling oil line (70); and
- a main pressure regulating valve (12), wherein a first inlet of the main pressure regulating valve (12) is connected to the main controlling oil line (70), and a first outlet of the main pressure regulating valve (12) is connected to the cooling and lubricating oil line (60).

18. The hydraulic controlling system according to claim 3, wherein the hydraulic controlling system further comprises:
- a selector valve (7), wherein an inlet of the selector valve (7) is connected to the outlet of the second pump (3), a first outlet of the selector valve (7) is connected to the main controlling oil line (70), a second outlet of the selector valve (7) is connected to the cooling and lubricating oil line (60), and a controlling oil port of the selector valve (7) is connected to the main controlling oil line (70); and
- a main pressure regulating valve (12), wherein a first inlet of the main pressure regulating valve (12) is connected to the main controlling oil line (70), and a first outlet of the main pressure regulating valve (12) is connected to the cooling and lubricating oil line (60).

19. The hydraulic controlling system according to claim 2, wherein the hydraulic controlling system further comprises:
- a clutching controlling oil line (71), wherein the clutching controlling oil line (71) comprises a plurality of clutch-pressure controlling solenoid valves, first ports of the clutch-pressure controlling solenoid valves are connected to the oil-liquid storage (1), second ports of the clutch-pressure controlling solenoid valves are connected to the main controlling oil line (70), and third ports of the clutch-pressure controlling solenoid valves are individually connected to corresponding clutches; and an electrohydraulic parking oil line (72), wherein the electrohydraulic parking oil line (72) is provided with a parking switching solenoid valve (30), a first port of the parking switching solenoid valve (30) is connected to the oil-liquid storage (1), a second port of the parking switching solenoid valve (30) is connected to the main controlling oil line (70), and a third port of the parking switching solenoid valve (30) is connected to a parking piston (31).

20. The hydraulic controlling system according to claim 3, wherein the hydraulic controlling system further comprises:

a clutching controlling oil line (71), wherein the clutching controlling oil line (71) comprises a plurality of clutch-pressure controlling solenoid valves, first ports of the clutch-pressure controlling solenoid valves are connected to the oil-liquid storage (1), second ports of the clutch-pressure controlling solenoid valves are connected to the main controlling oil line (70), and third ports of the clutch-pressure controlling solenoid valves are individually connected to corresponding clutches; and an electrohydraulic parking oil line (72), wherein the electrohydraulic parking oil line (72) is provided with a parking switching solenoid valve (30), a first port of the parking switching solenoid valve (30) is connected to the oil-liquid storage (1), a second port of the parking switching solenoid valve (30) is connected to the main controlling oil line (70), and a third port of the parking switching solenoid valve (30) is connected to a parking piston (31).

\* \* \* \* \*